March 19, 1957  A. L. WADE  2,786,188
TERMINAL STRUCTURES
Filed Sept. 12, 1952

INVENTOR.
ARTHUR L. WADE
BY Raymond W. Jenkins
ATTORNEY

United States Patent Office 2,786,188
Patented Mar. 19, 1957

2,786,188
TERMINAL STRUCTURES

Arthur L. Wade, Cleveland Heights, Ohio, assignor to Bailey Meter Company, a corporation of Delaware Application September 12, 1952, Serial No. 309,173

5 Claims. (Cl. 339—15)

This invention relates to terminal structures for power transmitting conduits.

Two general media are used in the instrument art to transmit variable effects over relatively great distances, i. e., distances beyond the normally contemplated length of mechanical linkages. These media are electrical power and fluid pressures. Innumerable types and variations of responsive units have been devised to respond to varying magnitudes of electrical signals or fluid pressures as the media magnitudes are established by transmitters directly responsive to variable conditions. In general then, there is a transmitter and a receiver connected together by a conduit or cable for variable signals; the present invention is directed to the manually controlled detachable terminal often desired between the conduit or cable and the receiver.

The present invention is not restricted in its usefulness to the precise system outlined supra. It may take many variations and remain within the scope of my conception. But where space is a limitation, economy an object, and interchangeability a requirement, the present invention has great utility. Or precisely, where it is desired to alternate between two different types of receivers, say between one responsive to fluid pressure and one responsive to electrical signals, the present invention conveniently provides a universal connection with which to cooperate either type of unit with its particular conduit. Electrical cables and fluid pressure conduits may remain permanently connected to one portion of the novel separable connection to enable the alternation of units to be made at any time.

The primary object of the present invention becomes to provide a novel terminal structure for a power conduit.

Another object is to provide a terminal structure for both a fluid pressure conduit and electrical cable.

Another object is to provide a common terminal structure for fluid pressure and electrical conduits which cooperate the conduits alternately between a fluid pressure responsive receiver and an electrical signal responsive receiver.

And the final object of the invention is to provide a multi-connection power plug structure which may characterize a station for cooperating a fluid pressure power unit with a fluid pressure conduit or an electric power unit with an electrical power conduit.

Figure 1:
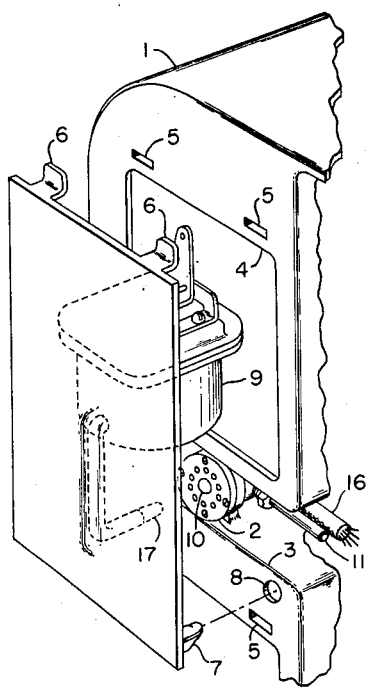
Fig. 1 shows the invention arranged to cooperate a fluid pressure conduit with a fluid pressure unit.
Figure 2:
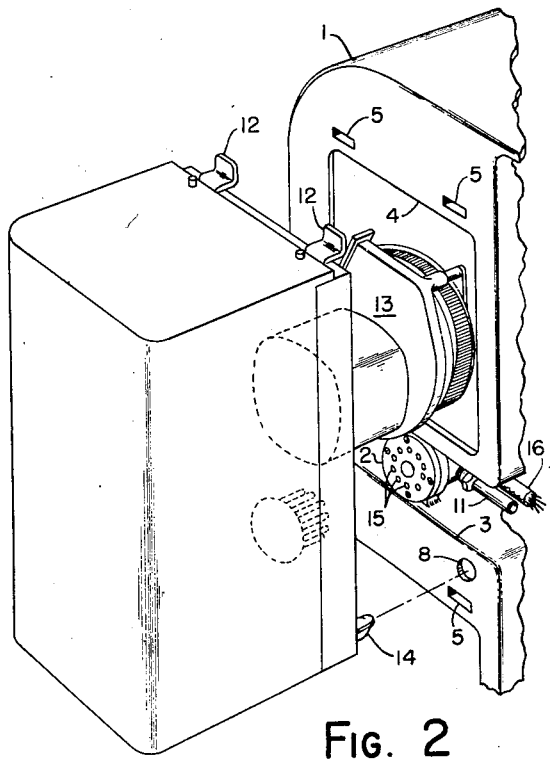
Fig. 2 shows the invention arranged to cooperate an electrical cable with an electrical unit.

Fig. 1 illustrates a combination of instrument case, power conduits, terminal structure and a fluid pressure actuated unit. The instrument case structure shown here, of which 1 is a portion, is presently disclosed in the co-pending application to Gorrie SN 309,341, filed September 12, 1952. To illustrate the utility of the present invention it is only necessary to show a portion of the Gorrie instrument case which is particularly well suited to accommodating the composite terminal body 2. This portion 1 of the instrument case illustrates what may be referred to as a "station." The general object of arranging the various structural features disclosed adjacent this station area is to provide for removably attaching either a fluid pressure operated unit or an electric operated unit to the instrument case at this point. The alternate accommodation of either type of responsive unit is illustrated in Figs. 1 and 2.

The advantages of being able to conveniently remove responsive units from specific stations on instrument cases is fairly obvious. When the units are easily removed, cleaning, maintainenance and calibration are correspondingly facilitated. If, additionally, a choice can be made between various type of units, such as illustrated by the fluid pressure and electric responsive units illustrated in Figs. 1 and 2, the flexibility of the instrument case as a unit becomes readily apparent. It is to the promotion of the interchangeability between the types of units that the present invention is directed. The present invention offers a single, unitary terminal body for either, or both, types of conduits bringing variable signals to a case station. The present invention, then, eliminates the necessity of a separate terminal structure for each type of power conduit by providing both types of female connections integrated into a single structure. The utility of both types of terminal structures is found in the invention with a saving of space, the economy of a single unit and a provision for interchangeability.

In Fig. 1, specifically, the composite terminal body 2 is located in a channel 3 formed into the back of instrument case 1. This channel 3 is adjacent aperture 4 which may be considered the center "station" proper because it is through this aperture that the various responsive units are inserted for actuation of indicating and/or recording mechanism within the case.

The composite body 2 is mounted in the channel 3 with its female connections presented in the plane of the back of the case. This arrangement provides for the male connections of the actuated units to seat positively and completely within the terminal body when the units have been secured into their place on the station of the case.

The structure for securing the responsive units to the station on the case are broadly illustrated as slots 5 in which tabs 6 on the unit are inserted. After this insertion the unit is pivoted from its tabs into the aperture 4 until male snap 7 seats in female snap 8, essentially a hole in the case back. At the same time that this cooperation of the snap members takes place, the male connection 17 from the fluid pressure responsive unit 9 is inserted into the female fluid pressure connection 10 of the composite terminal body 2. This cooperation communicates the fluid pressure responsive unit 9 with the fluid pressure power conduit 11, and the unit thereafter indicates and/or records the values transmitted to it by the conduit 11.

In Fig. 2 the cooperation of an electrical unit with the same case station takes place in generally the same fashion as found in Fig. 1. At the same instrument case station 1, the same composite terminal body 2 is positioned in the channel 3 adjacent aperture 4 as slots 5 cooperate with tabs 12 which are carried by the electrical responsive unit 13. Male snap 14 is similar to male snap 7 and cooperates with female snap 8 in exactly the same manner. As electrical responsive unit 13 is seated in the station by its manually controlled connections, its male electrical connections engage the one, or more, female electrical connections 15 in the composite terminal body 2. With this completion of electrical connections, the electrical responsive unit 13 responds to the electrical power variations in electrical conduit or cable 16.

Thus it is clearly illustrated, in a general way, that the same "station" in an instrument case may be utilized, through the present invention, by either a fluid pressure or an electrically responsive unit.

Figure 3:
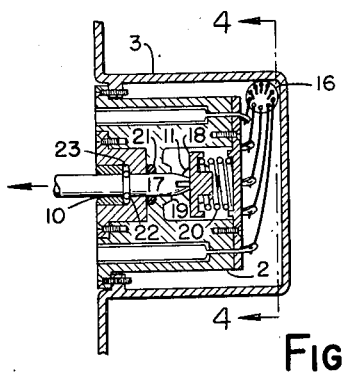
Fig. 3 is a cross section taken through the invention to show one arrangement of its internal structure.

Fig. 3 has been used to show, principally, the internal arrangement in the composite terminal body 2 for providing a seal-off structure for the conduit 11 terminated in the body 2. The male connection of the fluid pressure responsive unit 9 is shown as 17. It is positioned within female fluid pressure connection 10 to enable the pressures of conduit 11 to be transmitted to unit 9. Normally, valve 18 is forced against seat 19 by spring 20 to prevent the fluid pressure of conduit 11 from escaping out connection 10. However, male connection 17, when fully inserted in connection 10, disengages valve 18 from seat 19. The disengaging tip of male connection 17 is provided with a slot through which the pressure of conduit 11 is transmitted. Other features of this arrangement are notable, namely, O-ring 21 provides a seal around male connection 17 upon disengagement of the unit 9 from the composite terminal 2 until seat 19 has been engaged by valve 18. A locking ring 22 is carried in a groove in male connection 17 at a position from which it will engage groove 23 in connection 10 when male connection 17 is fully inserted into female connection 10.

The particular arrangement given the seal-off structure within body 2 necessitates, and conveniently so, the provision of fluid pressure conduit 11 insertion into the side of body 2 for communication with the chamber of seat 19 on valve 18. This side arrangement is regarded as convenient because terminal body 2 is arranged in channel 3 so that fluid pressure conduit 11 approaches it most conveniently from the side.

Figure 4:
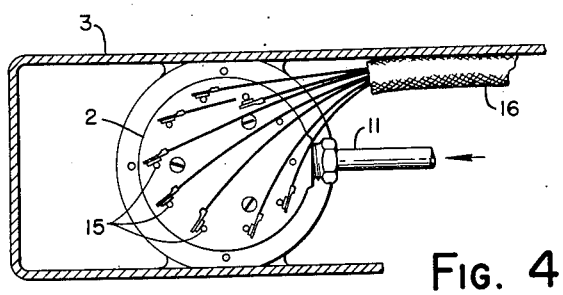
Fig. 4 is a section taken through Fig. 3 to illustrate the permanent connection of the conduits simultaneously to the terminal structures of the invention.

Fig. 4 is a view taken through a section of Fig. 3 in order to show the terminal body 2 from its rear where the connections with electrical conduit 16 are made. Fig. 4 also shows how conduit 11 comes into the side of body 2, but it is particularly illustrative of how electrical cable or conduit 16 can conveniently approach body 2 down channel 3 and make whatever connections are necessary with the rear of female electrical connections 15.

All of these figures are based on the assumption that composite terminal body 2 will be alternated in cooperation between a fluid pressure unit and an electrically operated unit. This arrangement is, of course, quite feasible. However, composite body 2 is not prohibitively expensive to use more or less permanently in either of these capacities with the possibility of the alternate usage remaining inherent in its structure.

Figure 5:
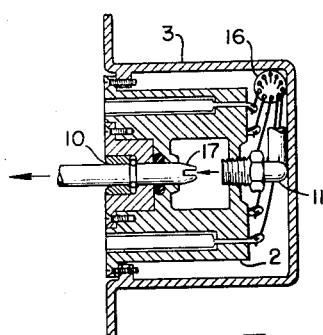
Fig. 5 is a section through the invention showing an alternate internal arrangement.

Fig. 5 is used to show a more simple arrangement for the fluid pressure connection of body 2. If no seal-off provisions are necessary in a particular fluid pressure installation, the embodiment of Fig. 5 represents an economical and efficient structure. Essentially Fig. 5 becomes Fig. 3 with 18, 20 removed. With Fig. 5, additional advantage may be found in possibly bringing fluid pressure conduit 11 through the rear of body 2 rather than through its side. Certain design requirements may make this feasible and desirable.

It is apparent that the male and female mating portions of the composite plug-in device may be reversed from the arrangement shown. The male electrical or male fluid pressure ends may be permanently located to the case 1 and the female ends carried by the removable instrument to be plugged-in.

While I have chosen to illustrate and describe certain preferred embodiments of my invention it will be understood that I do not wish to be limited thereby.

What I claim as new and desire to secure by Letters Patent of the United States, is:

1. A combination electrical and fluid pressure terminal for detachable cooperation with electrical and fluid pressure actuated mechanisms including, a body of insulated material arranged with one plane forming a receiving face and another plane forming a terminal face, a fluid pressure connection arranged centrally in the receiving face and extending into the interior of the insulating body, a connection for a fluid pressure conduit associated with the terminal face and extending into the interior of the body, valve means in the body interior between the fluid pressure connections and arranged for actuation by a male extension conduit from a fluid pressure actuated mechanism presented to the receiving face of the body, electrical connections arranged in the receiving face and about the centrally arranged fluid pressure connection, for cooperation with an electric responsive mechanism, and electrical connections on the terminal face adapted for connection to an electrical conduit and communicating with the electrical connections on the receiving face through the body of insulating material.

2. The combination of claim 1 including means for deachably connecting the entire combination to a stationary structure.

3. A combination terminal structure for fluid pressure and electrical conduits including; a generally cylindrical body of insulating material with receiving and terminal face planes parallel to each other; a metallic insert structure extending between the face planes and centrally disposed within the body and comprising a female connection in the receiving face plane for cooperating with a male fluid pressure connection, and a valve structure operated by the male connection and a connection in the terminal face for receiving a fluid pressure conduit permanently; female electrical connections extending between the face planes comprising, a female connection in the receiving face for cooperating with a male electrical connection, and a means in the terminal face for permanent connection with an electrical cable or conduit; and means for mounting the entire structure on a permanent base for alternate cooperation between electric and fluid pressure actuated mechanisms.

4. A composite terminal-socket as an article of manufacture including; a body of insulating material having a receiving and a terminal face; electrical connections extending between the faces and lying in the surface of a cylinder extending longitudinally between the the faces; female terminals on the electrical connections and in the receiving face of the body; a female fluid pressure connection arranged within the body, within the cylinder of electrical connections, and in the receiving face; a semi-permanent connection on each electrical connection in the terminal face; and a semi-permanent fluid pressure connection in the terminal face communicating with the female fluid pressure connection through the body.

5. The terminal-socket of claim 4 including; valve mechanism arranged in the interior of the terminal-socket and within the female fluid pressure connection so as to be actuated by a male connection inserted in the receiving face.

References Cited in the file of this patent

UNITED STATES PATENTS

| | | |
|---|---|---|
| 455,021 | Krehbiel | June 30, 1891 |
| 1,552,521 | VanBorn | Sept. 8, 1925 |
| 1,900,913 | Coleman | Mar. 14, 1933 |
| 1,914,317 | Wilson | June 13, 1933 |
| 1,936,015 | Harrel | Nov. 21, 1933 |
| 2,209,213 | Vernon | July 23, 1940 |
| 2,291,070 | Bruno | June 28, 1942 |
| 2,307,393 | Crowley | Jan. 5, 1943 |
| 2,389,895 | Colley | Nov. 27, 1945 |
| 2,510,126 | Meakin | June 6, 1950 |